United States Patent [19]

Thyni

[11] Patent Number: 4,556,971
[45] Date of Patent: Dec. 3, 1985

[54] APPARATUS FOR LOADING MEMORIES IN A TELECOMMUNICATION EXCHANGE

[75] Inventor: Thomas Thyni, Stockholm, Sweden

[73] Assignee: Telefonaktiebolaget LM Ericsson, Stockholm, Sweden

[21] Appl. No.: 525,033

[22] PCT Filed: Dec. 7, 1982

[86] PCT No.: PCT/SE82/00417
§ 371 Date: Aug. 8, 1983
§ 102(e) Date: Aug. 8, 1983

[87] PCT Pub. No.: WO83/02209
PCT Pub. Date: Jun. 23, 1983

[30] Foreign Application Priority Data

Dec. 15, 1981 [SE] Sweden .................. 8107510

[51] Int. Cl.$^4$ ............................................. H04Q 11/04
[52] U.S. Cl. .................................... 370/58; 179/18 ES
[58] Field of Search ................. 370/58, 85; 179/18 ES

[56] References Cited

U.S. PATENT DOCUMENTS

| 4,154,988 | 5/1979 | Fechalos et al. | 179/18 ES |
| 4,296,403 | 10/1981 | Haensel | 179/18 ES |
| 4,466,062 | 8/1984 | Krikor | 179/18 ES |

OTHER PUBLICATIONS

"Ericsson Review", No. 1, 1982, vol. 59.
"A PABX Concept Combining a New Method of Decentralized Control and PCM Switching", Session 13B PABX (11) I.S.S., Paris 1979.

*Primary Examiner*—Douglas W. Olms
*Assistant Examiner*—Kenneth I. Rokoff
*Attorney, Agent, or Firm*—Roberts, Spiecens & Cohen

[57] ABSTRACT

An apparatus is provided for charging memories in a telecommunication exchange which includes line modules (LIM). These have communication paths for communication with terminals and possibly external apparatus, and have a control computer (LPU) for maintaining communication between terminals or between a terminal and external apparatus. The communication between terminals connected to different modules is set up via a digital group selector. To enable writing from a data information source (BS, TS) to all the module control computers in a single process through a module (LIM 1) selected as a main unit, the data information to be written is preceded by conditioning information (INP 1, INP 2, etc). This actuates a loading means (UPK) for establishing a connection to an addressed module (LIM 1–LIM 32) with the aid of initial information written into an unchangeable memory (MIN) in the module. Furthermore, it adjusts a decoding means (AVK) in correspondence with an identity number assigned to the module until all modules are conditioned and connected to the data information source via a common communication path. Each of the modules can only take the data information for which its decoding means is adjusted. A terminal signal in the data information disconnects all the modules connected to the common communication path.

1 Claim, 2 Drawing Figures

APPARATUS FOR LOADING MEMORIES IN A TELECOMMUNICATION EXCHANGE

TECHNICAL FIELD

The invention relates to an apparatus for loading memories in a telecommunication exchange, including line modules, to each of which lines are connected for communication with terminals (subscriber apparatus, data terminals etc) as well as with external apparatus (subscriber exchanges, printers, communication networks etc), line modules being provided with control computers for establishing communication between terminals and also between terminals and external apparatus, communication between terminals associated with different modules being established over a digital group selector.

BACKGROUND ART

A telecommunication exchange of the type mentioned is described in the publication "A PABX concept combining a new method of decentralized control and PCM switching", International Switching Symposium, Paris 1979. With respect to conventional telephony it enables a large number of different functions, e.g. intercom, TELEX, video communication, data communication etc. and is modularly extendable without resorting to intervention in the existing modular line units.

In putting an exchange with a number of modules into service the program must be written into each of the memories. This question is time consuming, since in transferring data information from a tape recorder, for example, the recorder must be connected in turn to each of the modules which are not necessarily in the same building, but may be mutually spaced at distances in the order of magnitude of one kilometer from each other.

DISCLOSURE OF INVENTION

An object of the invention is to simplify writing data information such that it can take place in a single process, and centrally, without the data information source needing to be moved.

The invention is characterized as disclosed in the claims.

BRIEF DESCRIPTION OF DRAWINGS

The invention is described in detail below with the aid of an embodiment and with reference to the appended drawing, on which

PRESENTLY PREFERRED EMBODIMENT OF THE INVENTION

Figure 1:
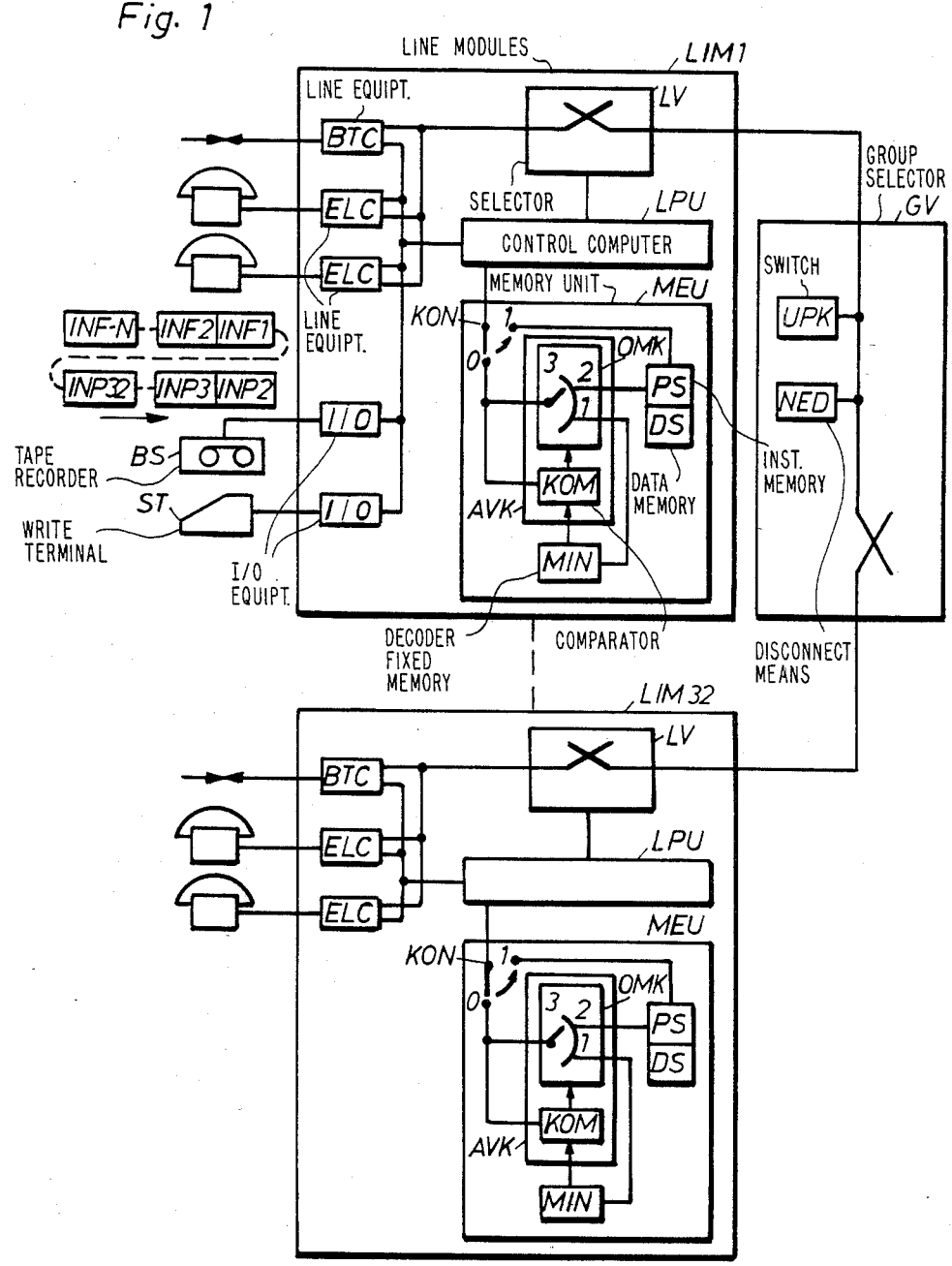
FIG. 1 illustrates, in the form of a block diagram, a telecommunication exchange with an apparatus in accordance with the invention.

In FIG. 1 line modules are denoted by LIM 1-LIM 32 to which telephone subscribers are connected each through its line equipment ELC and external lines, e.g. to and from other exchanges, through line equipment BTC. Each module contains a control computer LPU, the memory unit MEU of which includes an instruction memory PS and a data memory DS (operation memory). A tape recorder is denoted by BS and a write terminal by ST with the aid of which data information can be supplied to the control computer LPU via I/O equipment. A digital selector means LV is used to establish telephone communication with a subscriber connected to the same module, and via a group selector means GV also to a subscriber connected to another module LIM. Such a telecommunication exchange is previously known from the publication mentioned in the introduction.

When there is the question of introducing new data information in the program or data memory in one or more of the control computers LPU the tape recorder BS, which contains the new information, must be connected to each of the modules, which can be positioned up to 1 km from each other. This can be very time-consuming.

In accordance with the invention, the tape recorder BS needs only to be connected to one of the modules, and from there the data information can be transferred to each of the modules without the data information source being moved. For this purpose the memory unit MEU in each module is provided with an unchangeable memory MIN, such as a read only memory, (start up memory) in which initial information is inserted without regard to the future identity of the module, which the latter will receive with regard to its position in the exchange. The initial information enables each module to carry out certain functions when the system is put into operation. This information permits one of the modules (LIM 1), which is connected to a data source (BS, ST) via I/O equipment, to determine this situation and transmits control signals to the I/O equipment so that a first portion of the data information is supplied to the memory unit MEU of the control computer LPU in this module. This first portion of this data information converts the module in question (LIM 1 in this example) into a main unit, which means that it subsequently supplies the remaining portion of the information from the data source BS to the other modules.

The initial information which is identical in all modules has also a second task, namely enabling conditioning of the modules with the aid of the conditioning information obtained via the main unit. This is indicated in FIG. 1 by a decoder AVK containing a switch OMK and a comparator KOM. After conditioning of the individual modules has taken place, they can receive the data information necessary for their operation from the data source. The conditioning information coming from the main unit first actuates a switching means UPK in the group selector GV, so that this sets up a connection to the respective module and maintains this communication during a selected time slot until all modules have been loaded with information. On obtaining the first portion of the conditioning information, e.g. that the module in question will obtain the identify LIM 2, the unchangeable memory MIN in the respective module enables the control computer therein to adjust the comparator KOM in the decoder in a corresponding manner. Accordingly, only signals identified as "LIM 2" will be received and fed to memory MIN via the switch position 1 so that the comparator is conditioned with the information associated with the assigned identity of the module, as will be more closely explained in conjunction with FIG. 2. The decoder can subsequently only receive data information INP 2 intended for this module, while it ignores information intended for other modules. The continued conditioning information INP 3 intended for the next module is fed from the tape recorder to the connection means UPK which, via the connection path associated with the module and the same time slot which is still connected to the previously conditioned module, connects this subsequent module to the tape recorder so that the decoder in this module as well is conditioned to take no notice of information intended for other modules.

When conditioning of all the modules is terminated, the switch OMK in them is set to the position 2, the tape recorder then being connected to all the modules via the comon time slot and the connected paths. Via such paths there is now fed in the data information INF 1, INF 2 etc. which is to be written into all the modules, each of which can only receive its own data information. This information is fed via the switch position 2 to the memory PS, DS. For every data information determined by the decoder as associated with another module, the switch OMK is set to the rest position 3 to prevent input. When the whole of the data information has been supplied, a termination signal ensures that a contact KON is set from 0-position to 1-position, where the input of the memory unit MEU is connected to PS, DS, whereby the decoder function ceases, and also that the common connection is disconnected with the aid of a disconnection means NED, so that the exchange is ready for operation.

Figure 2:
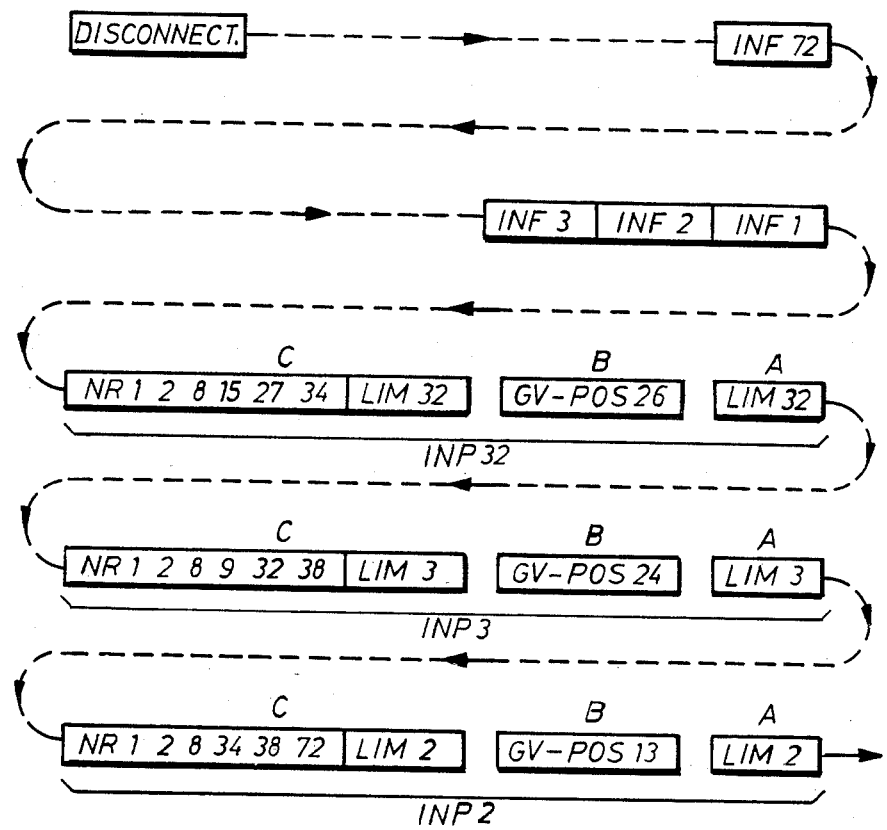
FIG. 2 illustrates an example of the information flow supplied to the exchange when starting up.

FIG. 2 schematically illustrates an example of an information flow during conditioning as well as during the introducing of data information to the control computer LPU of the respective line module. The conditioning information INP 2, INP 3 etc. contains the address (position number) to which the connection means UPK shall set up group selector GV, e.g. the GV position 13, furthermore the identity which the module in question is to obtain, e.g LIM 2, and which is sent to this module via the connected group selector GV position. A further portion indicates what information units are to be received by this LIM, and the decoder is adjusted to receive the information units mentioned in connection with FIG. 1, e.g. the units 1, 2, 8, 34, 39, 72 (information number designators). These three portions of the information flow are denoted by A, B and C in FIG. 2. When the whole of the conditioning information up to INP 32 has been supplied over the set-up connections, the data information divided into units INF 1–INF 72 then follows, and these are fed in parallel to all the modules serially. The modules can of course only receive the information units for which they are conditioned while they ignore the remainder. After the last data section INF 72 there follows the disconnection signal, which puts the contact KON to position 1 and subsequently disconnects all the connections set up.

A schematic presentation has been used in the description, with a comparator and a switch to explain the conditioning of the modules and reception of the information flow therein. However, the inventive concept is valid even if arithmetical and logical circuits are used instead of these means.

I claim:

1. In a telecommunications system comprising a plurality of similar line modules for communication with terminals and at least one group selector for interconnecting the line modules, each of said line modules including at least a controlled selector means for setting lines connected to the line module and to said group selector, wherein each line module is assigned to a different position of said group selector, the group selector establishing the communications from at least one line module to the other line modules in response to received position numbers, a control computer including an operation memory unit for controlling said controlled selector means, the improvement for facilitating the loading of data information into the operation memories of the line modules comprising a start up memory for storing a prerecorded start up program in each of the line modules, the prerecorded start up program of said at least one of the line modules controlling the associated control computer to be responsive to an external data source for transmitting data information therefrom to the group selector, the prerecorded start up program in the start up memories of at least said other line modules controlling the associated control computers to receive data information from the group selector, comparator means in each of at least said other line modules for comparing stored information—number designators with received information—number designators and upon equality emitting a control signal, means in each of at least said other line modules for storing information—number designators, a switch means in each of at least said other line modules for controllably connecting the associated control computer to its operations memory in response to control signals received from the associated comparator means whereby received data information are stored in said operation memory, and a data source connected to said at least one line module for first serially transmitting thereto sets of information words wherein the first information word of the set is a position number for controlling said group selector to establish a connection to a particular other line module and the second information word of the set is a group of information—number designators to be stored by said particular other line module, and second serially transmitting thereto another set of information words each prefixed by an information—number designator and followed by data information whereby the information words of said other set are fed to all of said other line modules so that the operation memories of said other line modules receive the data information associated with the stored information—number designators under control of the associated comparator means.

* * * * *